Figure 1:
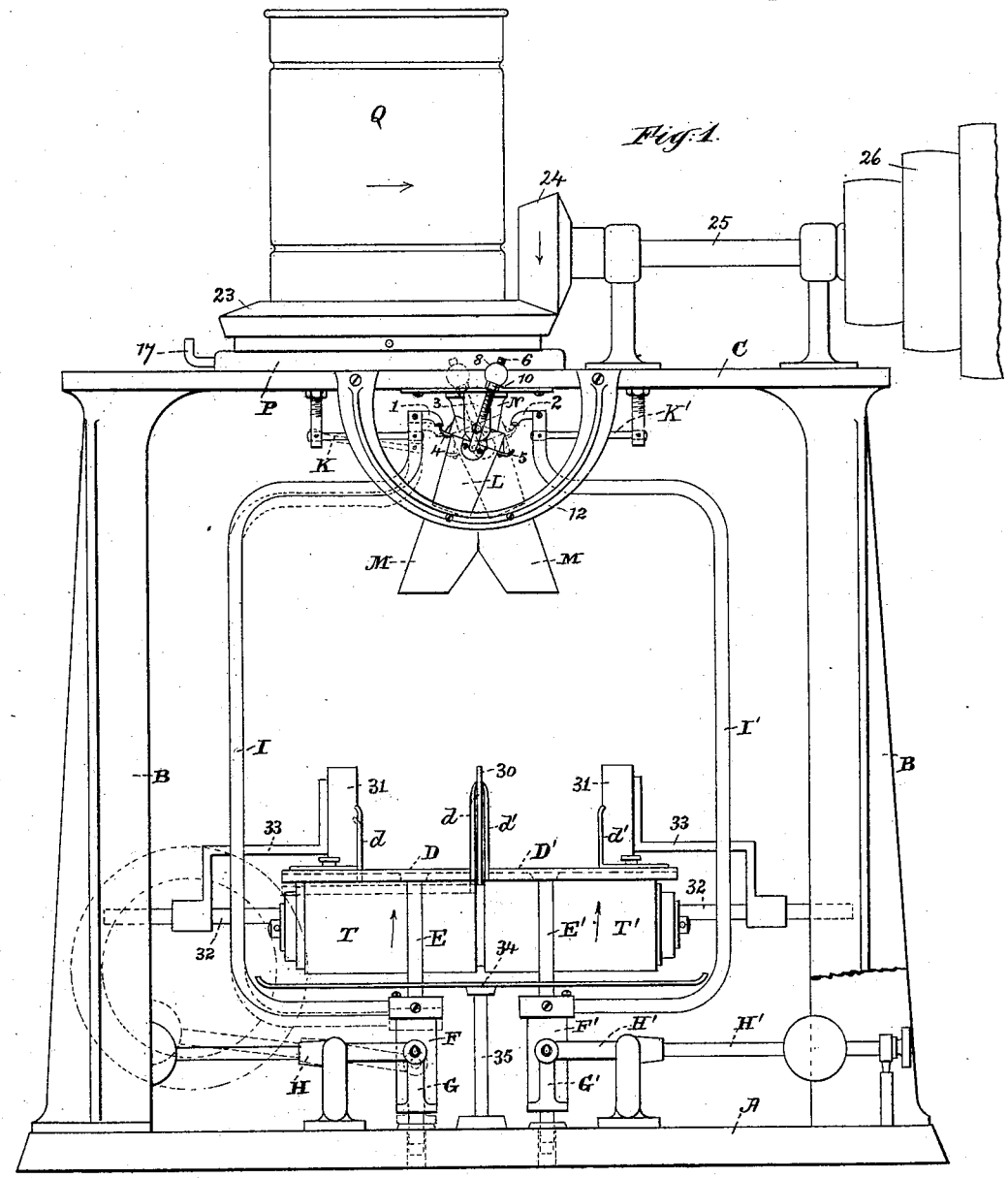

(No Model.) 4 Sheets—Sheet 1.

C. C. CLAWSON.
AUTOMATIC WEIGHING AND PACKAGE FILLING MACHINE.

No. 360,511. Patented Apr. 5, 1887.

Witnesses:
Charles R. Searle,
Jas. K. McCathran

Inventor:
Clement Coleridge Clawson
by Chas. J. Hedrick
his attorney

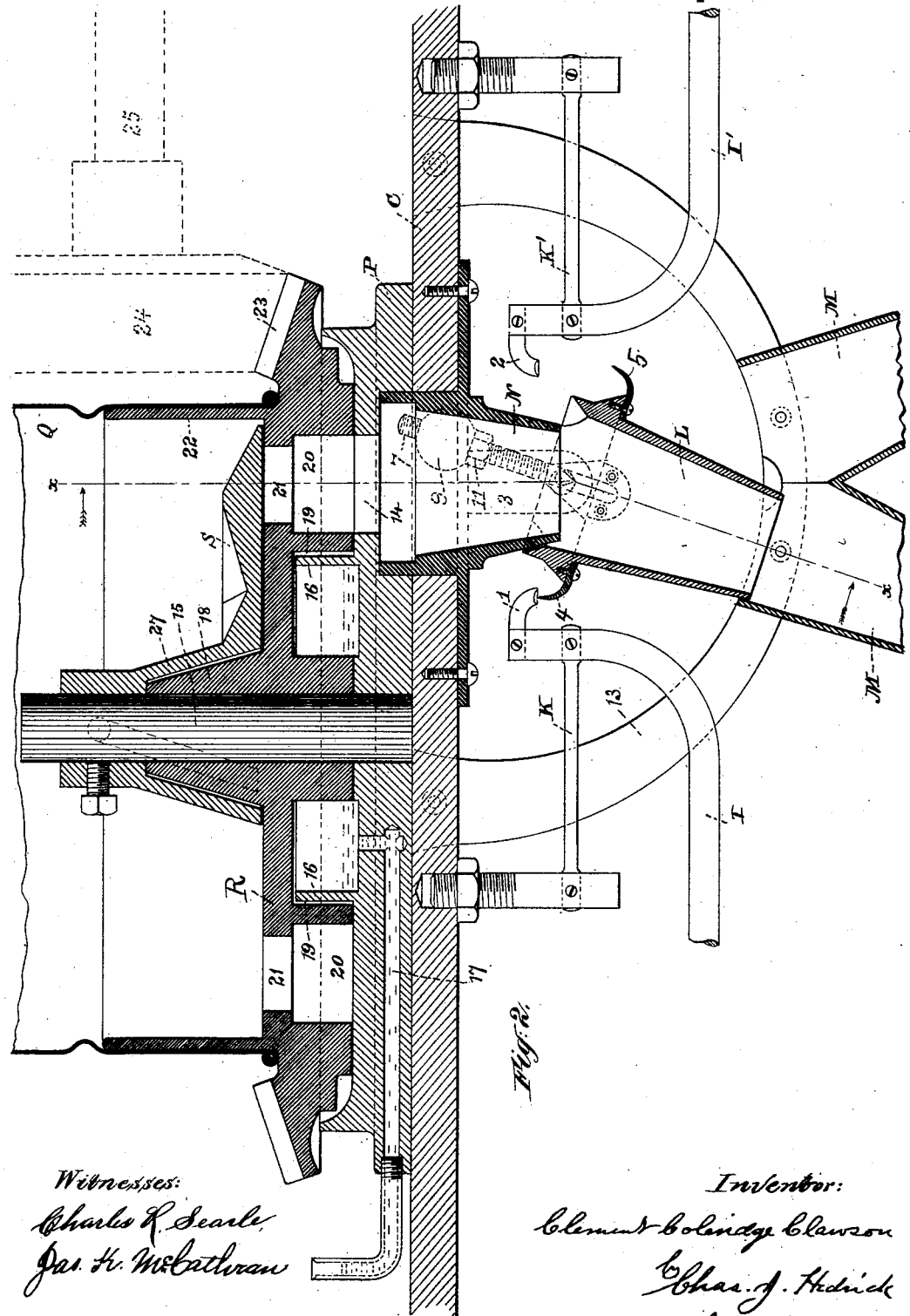

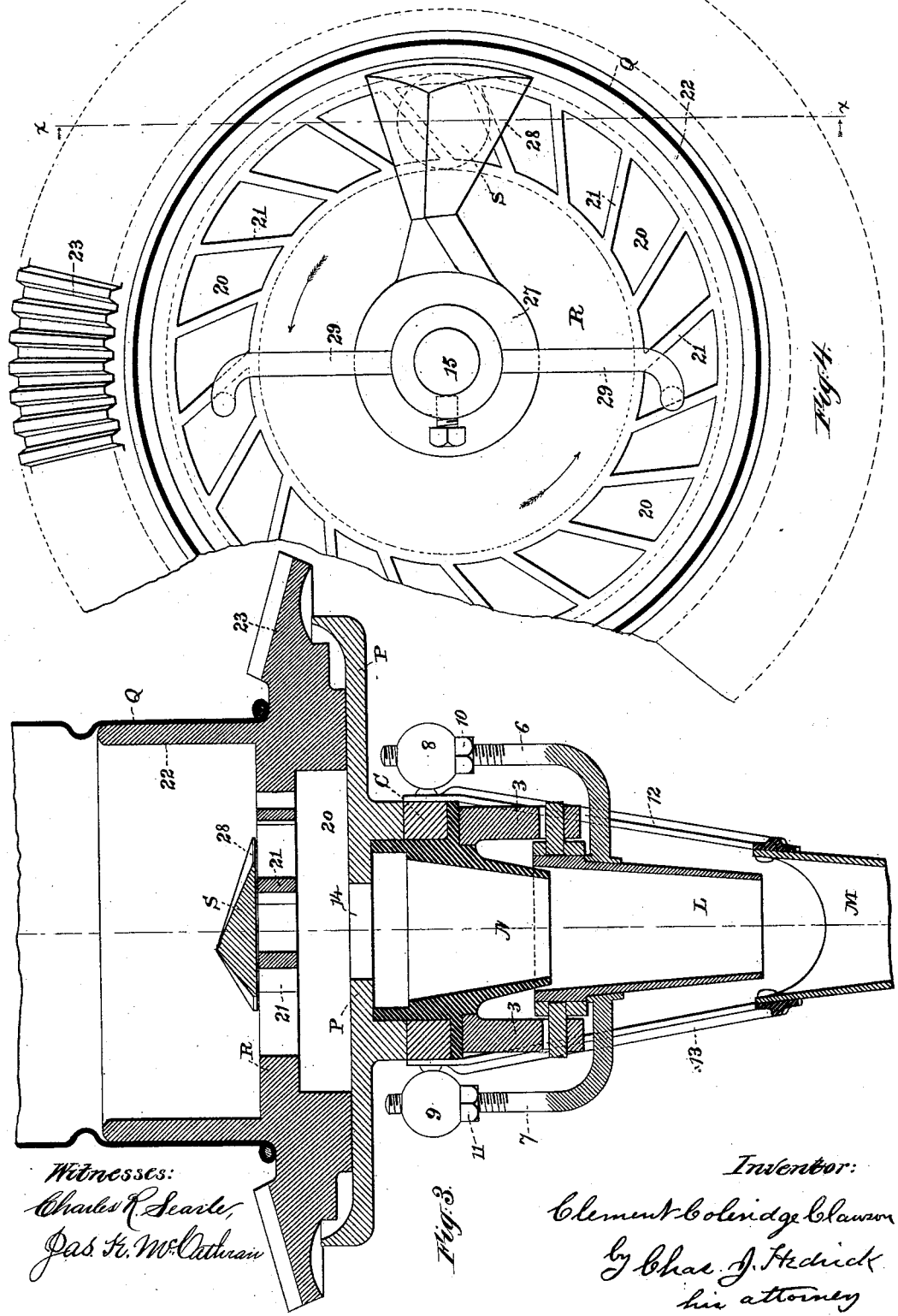

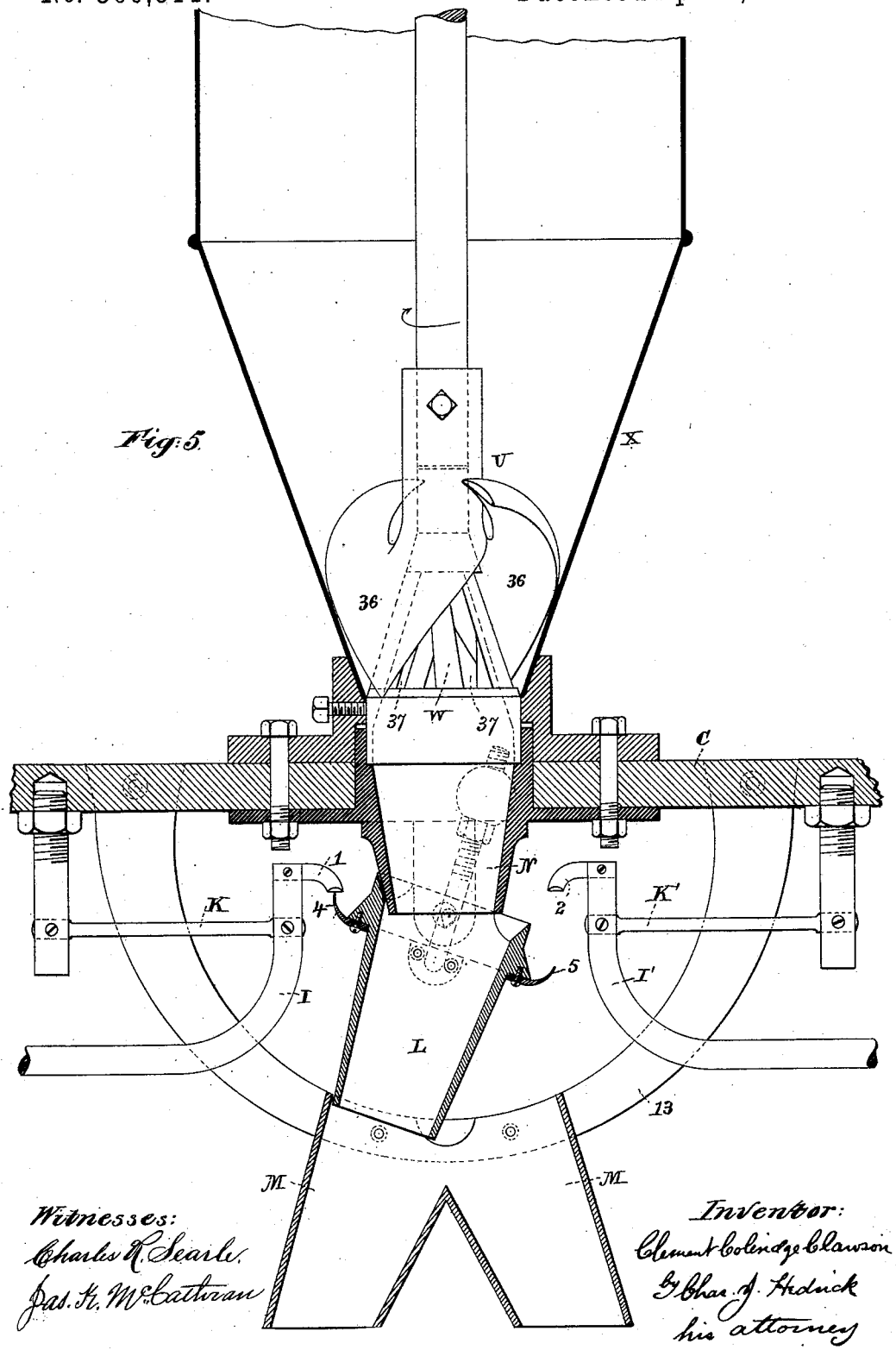

UNITED STATES PATENT OFFICE.

CLEMENT COLERIDGE CLAWSON, OF NEWARK, NEW JERSEY, ASSIGNOR, BY DIRECT AND MESNE ASSIGNMENTS, TO THE UNITED STATES MACHINE AND INVENTIONS COMPANY, OF NEW YORK.

AUTOMATIC WEIGHING AND PACKAGE-FILLING MACHINE.

SPECIFICATION forming part of Letters Patent No. 360,511, dated April 5, 1887.

Application filed October 18, 1886. Serial No. 216,562. (No model.)

*To all whom it may concern:*

Be it known that I, CLEMENT COLERIDGE CLAWSON, a citizen of the United States, residing at Newark, in the county of Essex and State of New Jersey, have invented certain new and useful Improvements in Automatic Weighing and Package-Filling Machines, of which the following specification is a full, clear, and exact description.

This invention relates more particularly to machines for filling boxes, cans, or other packing-vessels with granular or pulverulent solids or liquids to form packages of a definite weight, although it is in part applicable to other weighing-machines, and is, to a certain extent, independent of weighing-machines.

In automatic weighing-machines it is customary to deliver the material in a stream into a receptacle, which may be a permanent part of the weighing-scale or a box, can, or other package, which is temporarily placed on the weighing-scale, and to stop the delivery into that receptacle when the proper weight has been received. Heretofore this stoppage has been effected in two ways—namely, first, by arresting the flow, and, second, by diverting the stream into another receptacle.

The first part of the present invention consists in an improved weighing mechanism of great simplicity, accuracy, and delicacy in which the stream is diverted from one receptacle to another. Its main features are as follows: (*a*) An oscillating spout mounted on a horizontal axis in bearings, (preferably on knife-edges,) and weighted or otherwise made to have the center of gravity above said axis, is combined with two separate scales arranged to be supplied in alternation from said spout, and provided each with its own individual shifting device, which is arranged to act directly upon the spout when the scale has received its load, in order to turn the same and change the delivery to the other scale. When the spout is turned sufficiently, gravity completes the movement. Heretofore where two scales have been combined with a shifting spout, the scales have acted upon said spout indirectly—that is to say, through a lever or some similar device common to both scales. Where there has been but one scale, an intermediate mechanism for enabling the scale to move the spout first one way and then another has of course been required. (*b*) The oscillating spout is provided with a weight or weights adjustable toward and away from the axis of oscillation, in order to lower and raise the center of gravity, as desired, so that the spout is more or less sensitive to pressures. This adjustment is important in adapting the mechanism to weighing different materials. (*c*) Each weighing-scale is provided with an upright shifter-rod, fastened at its lower end to a suitable moving part of the scale, and it acts upon the oscillating spout through this upright rod. Preferably the latter is fastened to the scale-pan, (including in that term all the parts supported by the short end of the scale-beam,) and is also connected at its upper end with the machine frame by a link, to steady it and to maintain the parallel position of the scale-pan in rising and falling.

The second part of the invention consists in the combination, with suitable feeding and feed-controlling means for delivering material to be weighed and for automatically arresting the delivery thereof, as required, of two weighing-scales arranged end to end—that is to say, with their scale-pans adjacent and their scale-beams extending in opposite directions—and provided each with a flat package-support open at front and back, so that the box or other vessel can be pushed across the scale-pan onto a suitable receiver. By this combination and arrangement one person can easily attend to two scales, supplying them with empty packages, and removing the full ones as fast as may be necessary. Although it may be used also with weighing-machines which arrest the flow of the material, it is particularly useful in machines which divert the stream from one scale to the other, and, in connection with that style of automatic weighing mechanism, constitutes a special feature of invention. By having the scale-beams off at one side, the end of an endless-belt conveyer may be presented to the plates that support the boxes or packages. This arrangement is a most desirable one, for reasons hereinafter stated, and constitutes another special feature of invention. This part of the invention also consists in the combination, with a weighing-scale having a package-plate or flat package-support, of a mechanical conveyer or a receiver of any kind in proximity to an open side of said plate, so that the packages may be pushed off the scale onto the conveyer or receiver. Preferably the scale-pans are provided with upright side plates to guide, and, if necessary, to support, the packages.

The third part of the invention consists in the combination, with an automatic weighing mechanism having a shifting spout, of a continuously-operating rotary feeding mechanism, particularly such as herein explained, for supplying material of a granular or pulverulent character in a steady stream. For weighing many substances such feeding mechanism is a necessity, because there is always more or less material supplied to the scale-pan after the latter begins to descend, and unless a uniform quantity is thus supplied the weighing becomes inaccurate. For fine weighing, also, a fine stream is necessary, and with some materials this can hardly be attained without a suitable feeding apparatus.

The fourth part of the invention consists in a special feed mechanism, of which the main features are as follows: (*a*) In connection with a suitable hopper or receptacle for the material there is a rotary feeder provided with an annular slot or groove formed therein and so arranged that said slot or groove is supplied continuously from said hopper, and the escape of the material from said slot or groove, except at the delivery-opening, is prevented by a stationary plate or guard, which is interrupted or perforated to form said opening. The material in the hopper fills the annular slot or groove, and as it is carried over the delivery-opening it falls or is forced out through the same, the result being a uniform flow through said opening. A stationary hopper with a rotating feeder could be used; but it is considered better to have the hopper attached to and rotate with the feeder, the latter furnishing a bottom to the hopper and the annular slot or groove being the outlet or hopper-mouth. A base-plate underlying this feeder constitutes the guard for keeping the material in the slot or groove. (*b*) The delivery-opening is covered by a plate above the rotating feeder, so that the bulk of the material in the hopper is separated from that in the slot or groove, and consequently the supply is taken only from the said slot or groove. In order to make a more perfect and ready division between the bulk of material in the hopper and that in the annular outlet, the feeder is provided at the upper part of the slot or groove with arms, which act in conjunction with the covering plate or separator aforesaid like the blades of shears. (*c*) When the hopper is attached to the feeder, the latter is preferably made in the form of a horizontal plate or disk, and has its bearing at the center; and in order to lubricate said bearing without liability of the oil getting to the material in the hopper, or in the feeding slot or groove, the base-plate is provided with a raised ring, which enters an annular recess in the feeder around said bearing, thus forming an oil-cup. An oil-passage communicates with this cup. (*d*) Also, the feeder, which turns on a stationary center-post, is provided with a boss or raised portion at the center around said post, and the covering-plate or separator fixed to said post has a hollow hub, which fits over the boss on the hopper-bottom and excludes the material in the hopper from the bearing. The hopper and feeder are rotated by an outside gear. This feeding mechanism could be used in connection with automatic weighing-machines which arrest the flow, a chamber being interposed between the feeding mechanism and the cut-off, as described in my application of even date herewith, (Case I,) No. 216,561. It is also capable of other applications.

The invention further comprises the additional new or improved constructions, combinations, and arrangements of parts hereinafter pointed out. It will of course be understood that all these improvements are embodied in one machine and co-operate to improve the operation thereof, although one or more of them may be used separately.

The following is a description of what is considered the best mode of applying the principle of the invention, reference being had to the accompanying drawings, which form part of this specification.

Figure 1 is a front elevation of a machine constructed in accordance with the invention; Fig. 2, a partial section in a vertical longitudinal plane; Fig. 3, a cross-section on lines $xx$ of Figs. 2 and 4, looking in the direction of the arrow, and Fig. 4 a partial view in plan. Fig. 5 is a sectional elevation illustrating another feeding mechanism, which, however, is not included in the present invention, except when employed in combination with an automatic weighing mechanism which controls the delivery by shifting the stream from one receptacle to another.

The machine-frame is composed of a bed-plate, A, two uprights, B, and a cross-piece, C. The two weighing-scales are supported on the bed-plate with their scale-pans adjacent and their scale-beams extending in opposite directions. As shown, the uprights B are open in the middle to allow the scale-beams to pass through. The scale-pans comprise each a package-plate, D D', respectively, their supporting-rods E E', the sleeves F F', in which they are adjustably secured, and the stirrups G G', by which they are suspended from the scale-beams H H', respectively. The package-plates D D' each have upright side plates, *d d'*, respectively, for guiding or guiding and supporting the packages, but are open at front and back. One of the side plates on each scale is adjustably secured to the package-plate D or D', and is set at a greater or less distance from the opposite plate, according to the width or thickness of the package to be introduced between them. The scale-beams are of course suitably supported on knife-edges, and have adjustable weights for regulating the quantity weighed. The shifter-rods I I' are fastened at their lower ends in the sleeves F F', respectively, and at their upper ends are connected with the cross-piece C by the links K K', respectively, whose length is just equal to the corresponding short arm of the scale-beam. The links steady and guide the shifter-rods and keep the package-plates D D' horizontal. Each of the shifter-rods has a finger, 1 and 2, respectively, for acting upon the oscillating spout L. This spout is hung on knife-edges from little hangers 3, which depend from the cross-piece C. It has lugs 4 and 5—one on each side—to receive the pressure of the fingers 1 and 2. The lug and the finger have contact-edges at right angles to each other, in order that the friction may be reduced to the smallest amount.

Attached to the front and back of the spout L are screw-rods 6 and 7, which project upward beyond the axis of oscillation, and carry weights 8 and 9 in the form of nuts. These weights more than counterbalance the weight of the spout below the axis of oscillation, so that when they have been moved past said axis in either direction they carry the spout over until it is arrested by a stop. By adjusting the weights on the rods, the center of gravity of the oscillating part can be raised or lowered, so that the spout is shifted with more or less pressure. Below each of the adjustable weights is a jam-nut, 10 and 11, respectively, for retaining it in the position to which it may be adjusted.

The lower end of the oscillating spout L enters, slightly, the upper part of a bifurcated stationary spout, M, supported from top piece, C, by the semicircles 12 and 13. The oscillation of the spout L delivers the stream of material alternately into each leg of spout M, and this leg delivers it into the package on the corresponding scale.

The stationary spout N is fastened by a flange to the cross-piece C. It projects downward into the upper part of the oscillating spout L, and upward through a hole in the cross-piece, terminating just below the delivery-opening 14 in the base-plate P of the rotating feeder R. The stops to limit the oscillation of the spout L are formed by one or both of the stationary spouts, the contact therewith arresting the motion of the oscillating spout. At the center of the base-plate P the upright post 15 is fixed, and at a short distance therefrom there is a ring, 16, (preferably cast on the base,) which forms an oil-cup. An oil-passage, 17, communicates with the interior of this cup, the same being drilled through the base from the outside. The rotating feeder and hopper-bottom R turns upon the post 15 and rests upon the base-plate P, and just outside of the center bearing there is an annular recess, 19, on the under side, into which the ring 16 projects. Near the periphery is the annular feeding slot or groove 20. At the top thereof are the arms 21, which connect the periphery with the middle of the feeder or hopper-bottom, and also have the further object explained below. The cylindrical hopper Q fits over an annular flange, 22, on the feeder or hopper-bottom R. Outside of this flange is the bevel-gear 23, by which the hopper and feeder are revolved. It is engaged by the pinion 24 on the horizontal shaft 25, which is driven by a belt on pulley 26. This pulley has faces of different diameter for enabling the speed of revolution, and consequently the feed of material to the delivery-opening 14, to be varied.

Inside the hopper Q, above the delivery-opening 14, is the covering-plate or separator S, the hub 27 of which is fixed on the post 15. The lower conical part of hub 27 fits over a boss or raised portion, 18, on the feeder R. The edge 28 of the plate S, which meets the material as it is carried around, is beveled on top, so as to form an edge at the bottom for more easily dividing the material. With the same object this edge, and also the arms 21, are inclined to the radius of the feeder R, as shown in Fig. 4. As the arms 21 pass this edge they act like shear-blades in dividing the material between them. Stirrers 29, consisting of bent rods, are fixed to the hub 27, and serve to prevent the packing or caking of the material in the hopper.

Just behind each of the package plates D D', and about on a level with the package-plate when depressed, is a conveyer having belts T T', (see Fig. 1,) one for each scale. Between the belts there is an upright division-board, 30, and at the outside of the conveyer are the boards 31, which are supported on rods 32 by brackets 33. The brackets are adjustable on the rods, so as to leave more or less space on the belt between the division-board and the outside boards. The brackets have a long horizontal member, so that the outside boards can be adjusted considerably inside the outer edge of the belt, which may therefore be wide enough for large packages. The conveyer is or may be provided with tapping apparatus, such as described in my Letters Patent No. 315,730, dated April 14, 1885.

Under the package-plates D D', between them and their respective scale-beams H H', is a plate, 34, supported from the bed-plate A by the rod 35. The rods E E' pass through holes in this plate. It catches any material which may fall from the package or from elsewhere and would be apt to get to the scale-bearings or knife-edges.

The operation of the machine will be readily understood. The hopper Q is filled to the desired height with the material to be weighed out. An empty package is placed on the plate, D or D', toward which the spout L is at the time directed. The shaft 25 is then started and the hopper Q and feeder R rotated, the feeder R delivering a steady stream of the material through the delivery-opening 14 and spouts N L M into the package. During the filling the finger 1 or 2 of the shifter-rod I or I', as the case may be, remains out of contact with the lug 4 or 5 on the spout; but when the package has about received its charge the scale-pan descends, bringing the finger against the lug, which it then depresses, swinging the spout on its knife-edges. The finger carries the spout a little past the center, and then it is swung by the action of the weights 8 and 9 until arrested by contact with one or both the stationary spouts. In the meantime an empty package has been supplied to the second scale, and the stream of material being directed into it the filling proceeds until its scale-pan descends and shifts the spout L back to its first position. The filled packages are pushed across the plates D and D' onto the conveyer-belts T and T', respectively, and their places supplied with empty packages. It will be observed that one end of each endless belt is presented to the package-plate of the corresponding scale, so that when a package is pushed off the plate onto the belt its motion is continued in the same direction. This is a most desirable arrangement, because, for one reason, if the package should not be pushed quite off the scale the motion of the belt will finish the operation, and, for another reason, because the package is always certain to be well on the belt, where it is on at all, which it might not be if the belt were to travel parallel to the scale-beam.

For different substances it is often desirable to use a different feeding-mechanism. Such mechanism can be substituted for that shown, the other parts of the machine remaining as before. In Fig. 5 is a mechanism which is very desirable for feeding powdered starch and materials of that nature. It consists of a wheel, U, with depending screw-like arms or vanes 36, which rotate around a hollow cone, W, having in the walls thereof openings 37, through which the material is forced by said vanes. The wheel and cone are set in the contracted mouth of a hopper, X. In applying this feeding mechanism to the machine of Figs. 1 to 4, the base-plate P and the parts thereon are removed, the cone W is fixed in the upper part of spout N, and the hopper X is fastened on the cross-piece C, with the mouth in line with the spout N.

In an application of even date herewith, (Case I,) officially numbered 216,561, the feeding mechanism of Fig. 5 and also certain other devices shown in the present drawings are described and claimed as new inventions to be secured by Letters Patent. What is therein shown or described is reserved to that application, and is not included in the present invention.

In the foregoing description many details have been given for the purpose of enabling others practically to apply the principles of the invention. It will be understood that the invention is not limited to them.

Having now explained the principle of the invention and the best mode to me known of applying the said principle, I claim the following as my invention or discovery, namely:

1. The combination, with an oscillating spout mounted on a horizontal axis and having its center of gravity above said axis of two separate weighing-scales comprising each its individual scale-pan and scale-beam permanently connected with said pan, arranged to be supplied in alternation from said spout, and provided each with its own shifting device, which is arranged to act directly upon the said spout by pressing in one direction only, so that the spout has a freedom of motion independently of said shifting devices, substantially as described.

2. In an automatic weighing-machine, and in combination with the weighing scale or scales thereof, an oscillating spout mounted on a horizontal axis and adjustably weighted in order that the position of the center of gravity of the oscillating part, and consequently the sensitiveness of the spout to motion, may be regulated, the center of gravity of said spout independent of the adjustable weight being on the opposite side of said axis from said weight, substantially as described.

3. The oscillating spout provided with lugs for receiving the pressure of suitable shifting devices, and also with upwardly-projecting screw-rods rigidly fastened to said spout, and nut-weights adjustable on said rods, substantially as described.

4. The oscillating spout having its supporting-pivots or knife-edges near the top thereof, and provided with upright rods rigidly fastened to the spout, and weights adjustable on said rods above said pivots or knife-edges, substantially as described.

5. The combination, with an oscillating spout, of two weighing-scales and two upright shifter-rods carried one by each scale and movable in both directions with said scale, said rods being arranged to act alternately upon the spout, each when its own scale is overbalanced, so as to divert the stream to the other scale and to return independently of the said spout when the load is removed from its scale, substantially as described.

6. The combination, with an oscillating spout mounted on a horizontal axis and having its center of gravity above said axis, of two weighing-scales and two upright shifter-rods attached one to each scale and movable in both directions with said scale, each of said rods shifting the spout when its scale is overbalanced and returning independently of said spout when the weight is removed from said scale, substantially as described.

7. The combination, with an oscillating spout having lugs on the sides thereof, of the two weighing-scales, the upright shifter-rods, one attached to each scale-pan, and the fingers connected with said rods for pressing upon the appropriate lug to turn the oscillating spout, substantially as described.

8. The combination, with the oscillating spout mounted on a horizontal axis of an automatic weighing-machine, the same having lugs on the sides thereof on opposite sides of said axis, of the vertically-movable fingers for pressing upon said lugs to turn the spout, substantially as described.

9. In an automatic weighing-machine, and in combination with a weighing-scale and the means for stopping the delivery of material when the scale is overbalanced, an upright rod for controlling said means, said rod being rigidly fastened at its lower end directly to and movable vertically with the scale-pan in both directions, said scale-pan forming the support which upholds said rod, as described.

10. The combination, with the two scales and the adjustably-weighted oscillating spout, of the two shifter-rods, one fastened to and carried by each scale, substantially as described.

11. In a weighing-machine, and in combination with a weighing-scale thereof, and also with the means for stopping the delivery of material to said scale when it becomes overbalanced, an upright rod fastened to the scale-pan at its lower end, and a link connecting said rod at its upper end with the machine-frame, said rod operating to control said means, substantially as described.

12. The combination, in a weighing-machine, with means for controlling the delivery of material to be weighed, of two weighing-scales having each a plate or flat support for receiving a package to be filled and arranged end to end with the package-plates adjacent, and a receiver behind said plates in proximity thereto for receiving the packages, substantially as described.

13. The two weighing-scales having each a plate or flat support for packages and arranged end to end with the package-plates adjacent, in combination with a movable spout for supplying material to said scales in alternation, with means whereby the scales automatically shift said spout, and with a receiver behind said plates in proximity thereto, substantially as described.

14. The combination, with a weighing-scale of an automatic weighing and package-filling machine, said scale having a package-plate, of a receiver arranged in close proximity to an open side of said plate, substantially as described.

15. The combination, in an automatic weighing-machine, with a weighing-scale thereof having a package-plate, of a mechanical conveyer arranged in proximity to an open side of said plate, substantially as described.

16. The combination, in an automatic weighing-machine, with a weighing-scale thereof having a package-plate, of a mechanical conveyer having an endless belt to receive the packages arranged with one end in proximity to an open side of said plate, so that when a package is pushed from the said plate the endless belt continues the motion in the same direction, substantially as described.

17. The combination, with the two scales having each a package-plate open at front and back and arranged end to end with the package-plates adjacent, of an endless-belt conveyer having one end behind and in close proximity to said plates, substantially as described.

18. The combination, with automatic weighing-machines of the shifting-spout class, of the described feeding mechanism, comprising a hopper supported with its outlet directly above the shifting spout, and a continuously-rotating feeder at the bottom of said hopper arranged to discharge the material from said hopper in a uniform stream into said spout, the conduit or space between the feeder and the spout being at the least equal in cross-section to the stream delivered by said feeder, so as to afford no interruption to the flow of said stream into said spout, substantially as described.

19. A rotary feeder provided with an annular slot or groove formed therein, in combination with a hopper arranged to supply the material to said slot or groove, and the guard or plate arranged to retain the material in the groove until it reaches the delivery-point, substantially as described.

20. The combination, with the rotary feeder provided with an annular slot or groove formed therein, of a hopper to supply the material to said slot or groove, the guard or plate to retain the material in the slot or groove until it reaches the point of delivery, and the covering-plate or separator to separate the material in the slot or groove from the bulk of material in the hopper, substantially as described.

21. A rotary feeder provided with an annular feeding slot or groove and having arms at the edge of the said slot or groove, in combination with a hopper and a covering-plate or separator arranged to co-operate with said arms in dividing the material in the slot or groove from that in the hopper, substantially as described.

22. The combined rotary feeder and rotary hopper, the feeder forming the bottom of the hopper and being provided with an annular feeding slot or groove, which forms the hopper mouth or outlet, substantially as described.

23. The combination, with the rotary feeder provided with an annular feeding slot or groove and the hopper attached to and rotating with said feeder, of the base-plate forming the guard to said slot or groove and supporting said feeder and hopper, substantially as described.

24. The combination, with the rotary feeder provided with a central bearing and the hopper attached to and rotating with said feeder, of the base-plate having a raised ring surrounding said center bearing and forming an oil-cup for lubricating the same, said feeder resting upon the base-plate inside the said ring, which projects above their contact-surfaces, substantially as described.

25. The combination, with the base-plate, the upright post, and the hopper, of the rotary feeder, whereby said hopper is supported and carried, and a stationary device fixed to said post in said hopper for acting upon the material therein, said feeder being provided with an outside or peripherical gear and having a raised boss in the center, and said stationary device having a hollow hub which fits over said boss, substantially as described.

26. The combination, with the base-plate provided with the delivering-opening and central oil-cup and the upright post, of the feeder having the central boss, and provided with an outside or peripherical gear, the hopper carried by said feeder, and the covering-plate or separator fixed to said post and provided with a hollow hub which fits over said boss, all substantially as described.

27. The combination of the rotary feeder, the rotary hopper, the stationary base-plate provided with a delivery-opening, the covering-plate or separator, and the stirrers inside said hopper above said covering-plate or separator, substantially as described.

28. The combination, with an automatic weighing-machine, of a feeding mechanism having a rotary feeder provided with an annular feeding slot or groove, whereby the material is delivered in a steady stream, substantially as described.

29. The combination, in an automatic weighing-machine, with two scales comprising each a package-plate and a supporting-rod as part of their scale-pans and having said package-plates arranged side by side, of a common protecting-plate arranged between the package-plates and the scale-beams, and a supporting-rod fastened at the bottom to the bed-plate of the machine between the ends of the scale-beams and at the top to the middle of said protecting-plate, substantially as described.

30. The herein-described automatic weighing and package-filling machine, comprising, in combination with the machine-frame, the two scales having each a package-plate, the shifter-rods, the oscillating spout, the stationary spouts, the rotary feeding-hopper, and the base-plate provided with a delivery-opening, substantially as set forth.

31. In combination with an automatic weighing and package-filling machine having two weighing-scales, the conveyer having a belt for each scale, a division-board between the belts, and two outside adjustable boards, supported each by brackets having long horizontal members, substantially as described.

In testimony whereof I have signed this specification in the presence of two witnesses.

CLEMENT COLERIDGE CLAWSON.

Witnesses:
ALEX. WILEY,
FRED R. STAATS.